United States Patent [19]
Reibetanz et al.

[11] Patent Number: 5,470,084
[45] Date of Patent: Nov. 28, 1995

[54] HAND DRILL, IN PARTICULAR HAMMER DRILL

[75] Inventors: Wilbert Reibetanz; Otto Baumann; Rolf Mueller, all of Leinfelden-Echterdingen; Bernd Ruckh, Waldenbuch, all of Germany

[73] Assignee: Robert Bosch GmbH, Stuttgart, Germany

[21] Appl. No.: 335,151

[22] Filed: Nov. 7, 1994

[30] Foreign Application Priority Data

Dec. 16, 1993 [DE] Germany ............... 42 43 013.9

[51] Int. Cl.⁶ ............... B23B 31/04; B25D 17/08
[52] U.S. Cl. ............... 279/19.3; 173/48; 279/62; 279/137; 279/902
[58] Field of Search ............... 279/19, 19.3–19.5, 279/60–65, 902; 173/48

[56] References Cited

U.S. PATENT DOCUMENTS

| | | | |
|---|---|---|---|
| 4,585,077 | 4/1986 | Bergler | 279/19 |
| 4,621,818 | 11/1986 | Rohm | 279/19 |
| 4,775,159 | 10/1988 | Manschitz | 279/19 |

FOREIGN PATENT DOCUMENTS 4104131  11/1991  Germany.

Primary Examiner—Steven C. Bishop
Attorney, Agent, or Firm—Michael J. Striker

[57] ABSTRACT

A hand drill, in particular a hammer drill has a combination tool holder provided with a first tool receptacle with clamping jaws displaceable relative to a base body and adjustable by a rotatable adjusting ring to different diameters of tool shafts, and a second separate tool receptacle for tools with a groove shaft and provided with means for at least one driving and locking as well as with a central receiving opening for the groove shaft tool, and an arresting device having a blocking slider which is arranged displaceably in the base body and non-rotatably connected with the base body in a circumferential direction, the blocking slider being movable between a first end position in which a radially inwardly directed end of the blocking slider engages in the central receiving opening and is provided with teeth such that when a groove shaft tool is inserted in the receiving opening the teeth in another end position of the blocking slider non-rotatably engage with counter teeth connected with the adjusting ring.

10 Claims, 3 Drawing Sheets

HAND DRILL, IN PARTICULAR HAMMER DRILL

BACKGROUND OF THE INVENTION

The present invention relates to a hand drill, and in particular a hammer drill. More particularly, it relates to a hand drill with a combination tool holder having a first receptacle and a second tool receptacle.

Hand drills of the above mentioned general type are known in the art. One such hand drill is disclosed, for example in the German document DE 41 04 131 A1. This hand drill has a combination tool holder with a first tool receptacle for a tool with a round shaft and a second tool receptacle for a tool with a groove shaft. The first tool receptacle for the tools with the round shafts is formed as a jaw chuck with clamping jaws which is adjustable by a chuck key. In such a hand drill it is possible to clamp the groove shaft tool inserted in the second tool receptacle additionally with the clamping jaws of the first tool receptacle. Due to the additional clamping in the impacting operation the impact power is reduced and the wear is increased.

SUMMARY OF THE INVENTION

Accordingly, it is an object of the present invention to provide a hand drill, which avoids the disadvantages of the prior art.

In keeping with these objects and with others which will become apparent hereinafter, one feature of the present invention resides, briefly stated, in a hand drill in which the combination tool holder has at least one arresting device with a locking slider which is arranged preferably radially displaceably in a base body and non-rotatably connected with it in a circumferential direction, in its one end position it engages with an end oriented radially inwardly into the central receiving opening and provided with teeth which, when the groove shaft tool is inserted in the receiving opening, in another end position of the locking slider non-rotatably engages with the counter teeth connected with the adjusting ring.

When the hand drill is designed in accordance with the present invention, the clamping jaws of the first tool receptacle for tools with round shafts are automatically arrested when the groove shaft tool is inserted in the second tool receptacle, so that an additional clamping then is not possible. In the hand clampable first tool receptacle an automatic closing of the clamping jaws in the impacting operation of the hand drill is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
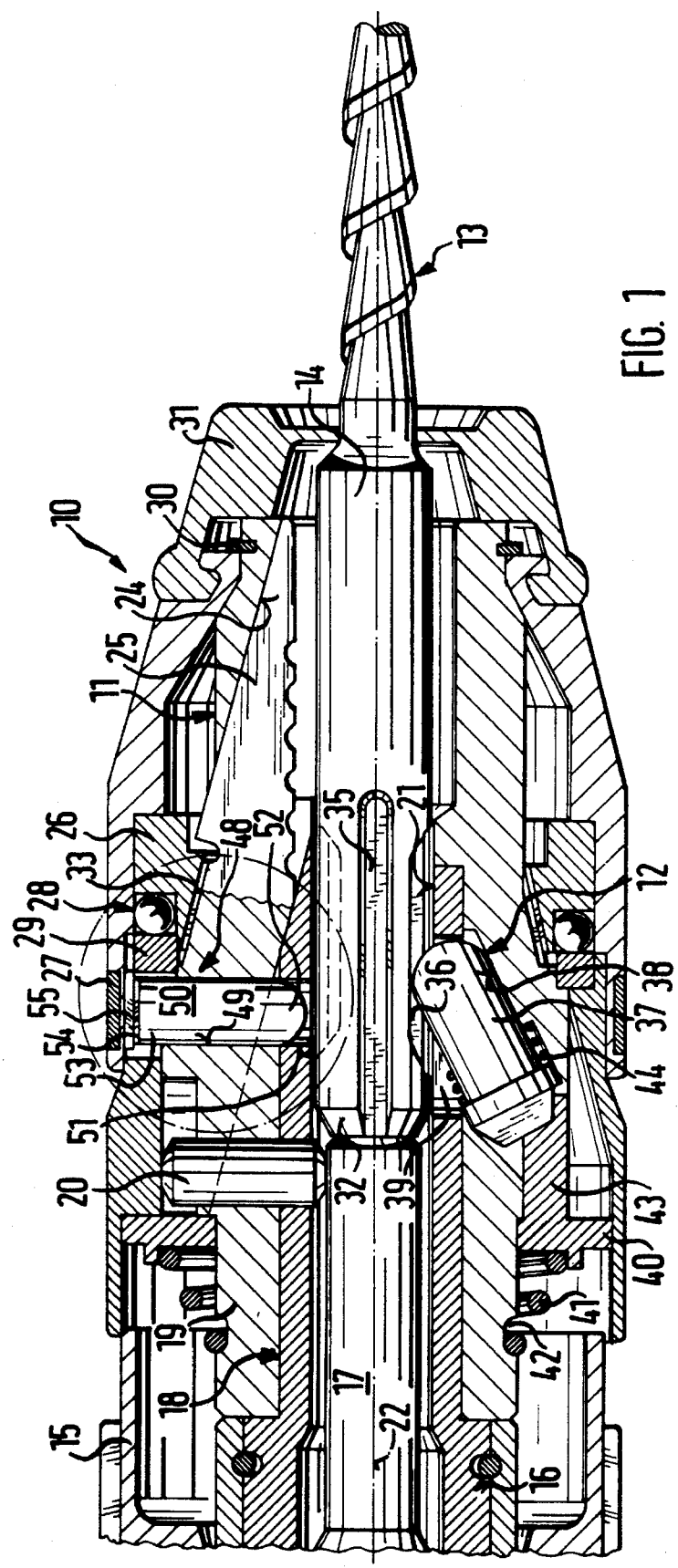
FIG. 1 is a view showing a partial section of a hammer drill provided with a combination tool holder in accordance with the present invention.

FIG. 1 shows a front, two-side part of a hammer drill with a combination tool holder 10. The combination tool holder 10 has a first tool receptacle 11 for tools with a round shaft and a second tool receptacle located further behind the first tool receptacle and provided for tools 13 with a groove shaft 14. A rotatably driven, hollow cylindrical guiding tube 16 extends outwardly beyond a housing 15, and an axially reciprocatingly driveable impact body 17 is arranged in the guiding tube. A hollow cylindrical base body 19 sits on a stepped portion 18 of the guiding tube 16. The base body 19 is connected through a radial pin 20 rotatably and axially non-displaceably with the guiding tube 16. The base body 19 is provided with three radially inwardly extending openings 24 which are uniformly offset relative to one another. Clamping jaws 25 are displaceably guided in the openings 24.

The three clamping jaws 25 are provided with teeth at their rear sides as well known in the art and can be manually adjusted by an adjusting ring 26 with corresponding teeth 33 inside the openings 24. The adjusting ring 26 is non-rotatably connected with an adjusting member 27 formed as an actuating sleeve. The adjusting ring 26 and the adjusting member 27 are axially non-displaceable relative to the base body 19. The adjusting member 27 is fixed forwardly by a safety ring 30 relative to the base body 19. The adjusting ring 26 is supported in an axial direction rearwardly through an axial bearing 28 on an abutment ring 29 which is axially fixedly connected with the base body 19. In the circumferential direction, the adjusting member 27 is rotatable relative to the base body 19 and then the clamping jaws 25 are adjustable through the adjusting ring 26. A protective cap 31 is held in the adjusting member 27 and closes the two-side part of the combination tool holder 10 in a dust-protective manner relative to an inserted tool.

FIG. 1 shows the combination tool holder 10 with the inserted groove shaft tool 13. The second tool receptacle 12 has an axially extending receiving opening 21 which coincides with the longitudinal axis 22 of the guiding tube 16 and provided for receiving a shaft 14 of the groove shaft tool 13. The diameter of the receiving opening 21 is selected to correspond to the shaft diameter of conventional groove shaft tool 13. In the shown embodiment the receiving opening 21 is formed in the offset portion 18 of the guiding tube 16. As disclosed in the German document DE 41 04 131 A1 which is incorporated here by means of a reference, the receiving opening 21 can also be provided in the base body 19. Two oppositely located, rearwardly open longitudinal grooves 35 are provided in the shaft 14. Two drivers which are inside the receiving opening 21 and not shown in detail engage in the longitudinal grooves 35 for driving the groove shaft tool 13. Two groove-like recesses 36 are provided in the shaft 14 and offset relative to the longitudinal grooves 35. They act for axial locking of the tool 13. The recesses 36 are therefore in an axial direction.

A locking body 37 engages in one of the two recesses 36 with a locked groove tool shaft 13 with axial play. It is arranged in an inclinedly inwardly extending opening 38 of the base body 19 and extends into a locking window 39 provided in the guiding tube 16. The locking body 37 is held in its locking position by a locking sleeve 40. The locking sleeve 40 is loaded axially forwardly by a spring force of a closing spring 41 and is supported with a projection 43 against the locking body 37. A closing spring 41 is supported at the other side in a ring groove 42 of the base body 19. For locking the locking body 37, the actuating sleeve 40 is displaced axially rearwardly against the pretensioning of the closing spring 41 so that the locking body 37 can deviate radially outwardly by a spring 44 arranged in the opening 38 and release the recess 36 of the groove shaft tool 13.

A radially displaceable blocking slider 50 is located in the base body 19 and forms a part of an arresting device 48 for the clamping jaws 25. The blocking slider 50 is arranged in a radial throughgoing receiving opening 49 and formed as a cylindrical blocking pin. The blocking slider 50 engages with an inner end 52 into the receiving opening 21 through a throughgoing opening 51 provided in the offset portion 18 of the guiding tube 16 and aligned with the receiving opening 49. It abuts against the shaft 14 of the groove shaft tool 13 and is prevented by it against displacement radially inwardly. Teeth 54 are formed on a radially inwardly extending end 53 of the blocking slider 50 and cooperate with counter teeth 55 provided on the adjusting member 27. In the locking position of the groove tool shaft 13 shown in FIG. 1, the teeth 54 engage in the counter teeth 55 so that the adjusting member 27 is not rotatable. The clamping jaws 25 and thereby the first tool receptacle 11 are located in their arresting position. The arresting position corresponds to a radial outer end position of the blocking slider 50. A closing of the clamping jaws 25 is then not possible. In FIG. 1 the arresting device 48 is shown in a common plane with the clamping jaws 25 for illustration purposes. It is to be understood that they can also be offset relative to one another in a circumferential direction.

Figure 2:
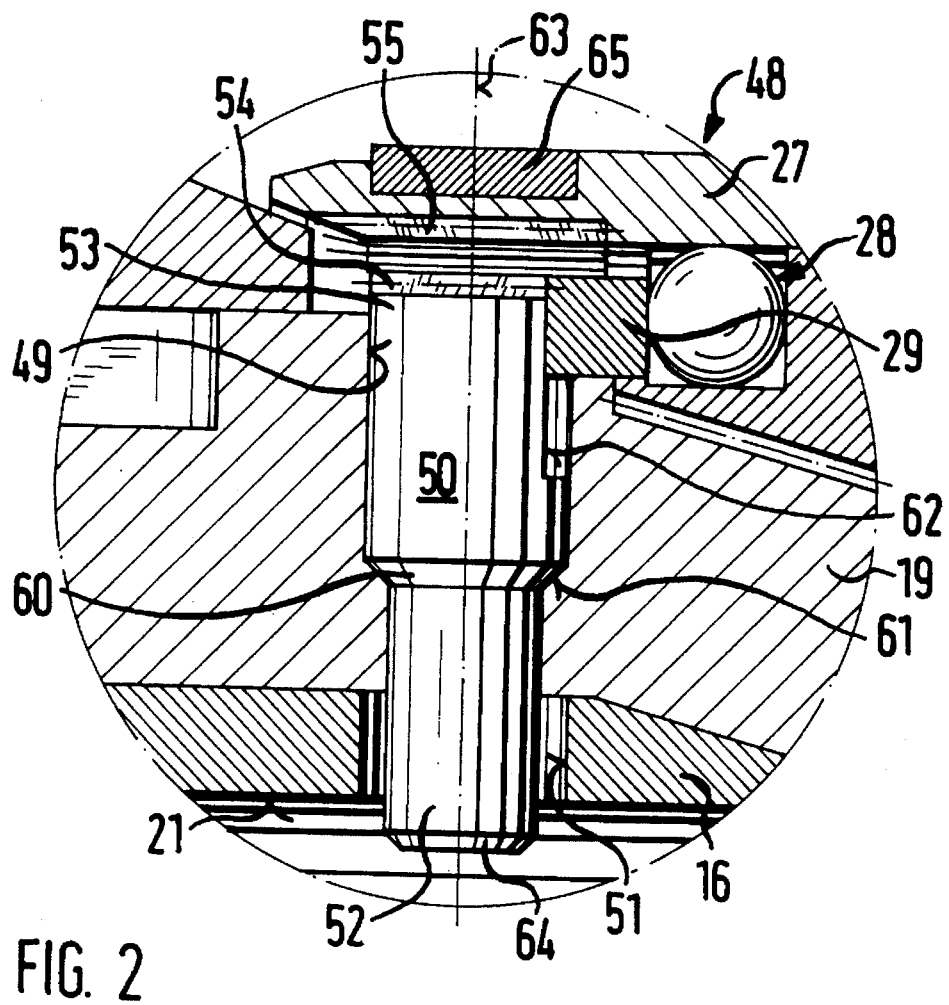
FIG. 2 is a view showing a section through an arresting device of the inventive hammer drill.

FIG. 2 shows a second embodiment of an arresting device 48. The parts of the second embodiment which correspond to the parts of the first embodiment of FIG. 1 are identified with the same reference numerals. The blocking slider 50 is here shown in its extended position. No groove shaft tool 13 is inserted in the second tool receptacle 12, so that the blocking slider 50 can be displaced radially inwardly inside the receiving opening 49. The teeth 54 on the blocking slider 50 disengage from the counter teeth 55 of the adjusting member 27, or in other words, the adjusting member 27 can be freely turned relative to the base body 19 in the circumferential direction and the clamping jaws 25 can be correspondingly displaced. The inner end 52 of the blocking slider 50 then extends through the throughgoing opening 51 in the guiding tube 15 radially into the receiving opening 21. The receiving opening 49 is formed in this embodiment as a stepped opening and reduces toward the receiving opening 21. The blocking slider 50 is formed so that it narrows radially inwardly and has a circumferential, conical step surface 60 which abuts against a corresponding abutment surface 61 of the receiving opening 49. In this manner it is prevented that the blocking slider 52 can be displaced further radially inwardly. The blocking slider 50 is located then in a radial inner end position. The length of the blocking slider 50 which extends maximal into the receiving opening 21 corresponds preferably to the height of the rotary driver, so that the arresting device 48 is not actuatable by a round shaft tool which by error is inserted all the way up into the receiving opening 21.

The blocking slider 50 is provided on its tool side with a flattening 62 and abuts with its flattened side against the abutment ring 29 and in particular on its end side which faces away from the axial bearing 28. Thereby the blocking slider 50 cannot rotate about its longitudinal axis 63, and the teeth 54 extend always parallel to the counter teeth 55. The flattening 62 extends in the longitudinal direction of the blocking slider 50 so far that, with the groove shaft tool 13 inserted in the receiving opening 21 as shown in FIG. 1 it can be pressed radially outwardly until the teeth 54, 55 engage one another. A chamfer 64 is formed on the inner end 52 of the blocking slider 50 and cooperates with an insertion chamfer 32 which is formed on conventional insertion tools to facilitate the radial displacement of the blocking slider 50 during insertion of the groove tool shaft 13. In this embodiment the adjusting member 27 formed as the actuating sleeve is composed of a synthetic plastic material. The actuating sleeve in a region located substantially radially in the extension of the blocking slider 50 is reinforced by a reinforcing ring 65 of metal. The reinforcing ring 65 prevents over arresting of the teeth 54, 55 which can otherwise occur due to the elasticity of the synthetic plastic material of the actuating sleeve. In this way a reliable arresting of the adjusting member 27 and thereby the clamping jaws 25 is guaranteed. After withdrawal of the reinforcing ring 65, the blocking slider 50 can be radially outwardly displaced with deformation of the actuating sleeve, until its inner end 52 releases the throughgoing opening 51 and thereby the dismounting of the base body 19 from the guiding tube 16 is possible.

Figure 3:
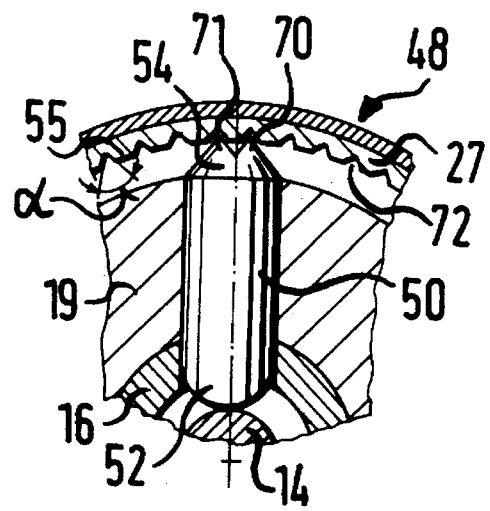
FIGS. 3, 4, 5 are views showing further embodiments of the arresting device of FIG. 2 in accordance with the present invention.

FIG. 3 shows a further embodiment of an arresting device 48. It illustrates a cross-section through the blocking slider 50. The blocking slider 50 is rounded in a semi-spherical manner at its inner end 52 and supported there against the tool shaft 14 of an insertion tool. The teeth 54 are formed by two parallel teeth 70, 71 which face one another and engage in corresponding gaps 72 in the teeth 55 of the adjusting member 27. The flank angle of the teeth 70, 71 or the tooth gaps 72 identified as an angle $\alpha$ is approximately 90° since then the inclination for sliding of the flanks relative to one another is small.

Figure 4:
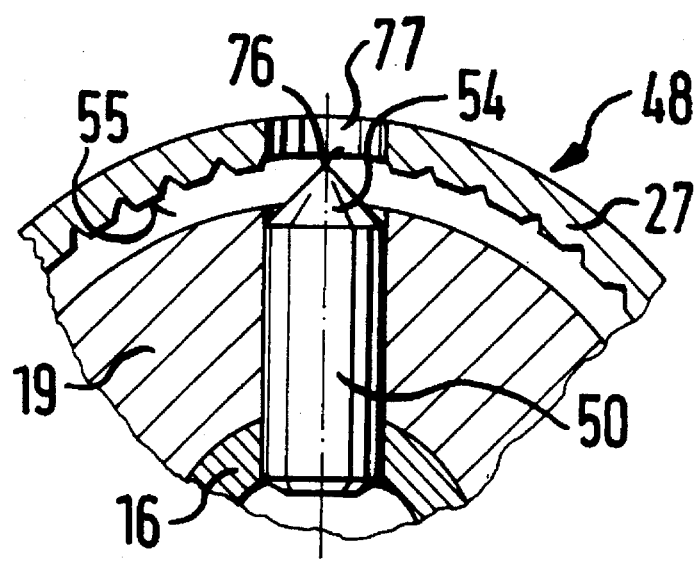

FIG. 4 shows an embodiment of the arresting device 48 in which the outer teeth 54 of the locking slider 50 are formed by just one tooth 76. The actuating sleeve (blocking member 27) is here formed as a one-piece element without a reinforcing ring and composed for example of metal. The counter teeth 55 are interrupted at one location by a mounting opening 77 for radially mounting and dismounting of the blocking slider 50 through it.

Figure 5:
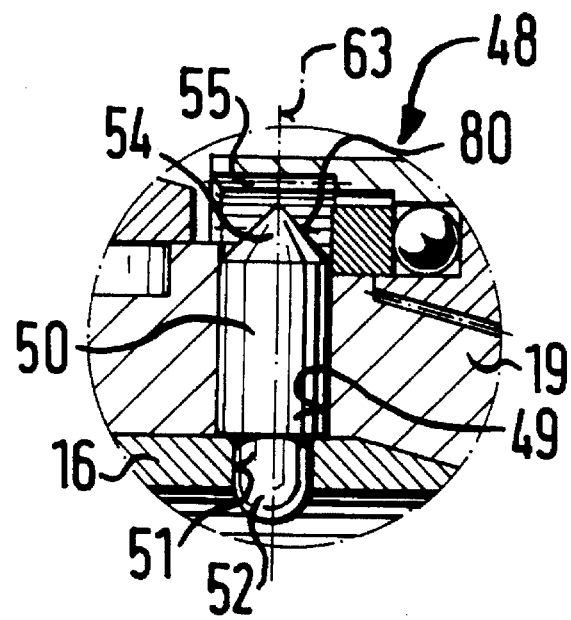

FIG. 5 shows a further embodiment of an arresting device 48. The blocking slider 50 is also formed cylindrically and offset toward its inner end 52. The outer end 53 of the blocking slider 50 is formed as a cone tip 80 provided with the teeth 54. The cone tip 80 in any rotary position of the blocking slider 50 around its longitudinal axis 63 can engage into the counter teeth 55, so that its rotary securing in accordance with FIG. 2 can be dispensed with. The receiving opening 49 in the base body 19 is formed with a uniform diameter. In contrast, the throughgoing opening 51 in the guiding tube 16 is reduced, so that the guiding tube 16 operates as an inner abutment for the blocking slider 50.

All examples described hereinabove can operate without a return spring for the blocking slider 50, since when the groove shaft tool 13 is not inserted the teeth 54, 55 can disengage with resistanceless radial displacement of the blocking slider 50 inwardly.

In addition to the shown embodiments, it is also possible to release the inventive arresting device with inserted tool shaft 14 by a rotatingly supported blocking slider 50. An axial displacement of the blocking slider 50 is also recommended.

It will be understood that each of the elements described above, or two or more together, may also find a useful application in other types of constructions differing from the types described above.

While the invention has been illustrated and described as embodied in a hand drill, in particular a hammer drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hand drill, in particular a hammer drill, comprising a combination tool holder provided with a first tool receptacle with clamping jaws displaceable relative to a base body and adjustable by a rotatable adjusting ring to different diameters of tool shafts, and a second separate tool receptacle for tools with a groove shaft and provided with means for at least one driving and locking as well as with a central receiving opening for a groove shaft tool; and an arresting device having a blocking slider which is arranged displaceably in said base body and non-rotatably connected with said base body in a circumferential direction, said blocking slider being movable between a first end position in which a radially inwardly directed end of said blocking slider engages in said central receiving opening and is provided with teeth such that when a groove shaft tool is inserted in said receiving opening said teeth in another end position of said blocking slider non-rotatably engage with counter teeth connected with said adjusting ring.

2. A hand drill as defined in claim 1, wherein said teeth are formed by several axially extending and radially oriented teeth.

3. A hand drill as defined in claim 1, wherein said teeth are formed by a single radially extending and axially oriented tooth.

4. A hand drill as defined in claim 1, wherein said teeth have a flank angle of substantially 90°.

5. A hand drill as defined in claim 1, wherein said teeth are formed as a conical tip.

6. A hand drill as defined in claim 1, wherein said blocking slider is formed as a cylindrical blocking pin which narrows to its radially farther inwardly located end.

7. A hand drill as defined in claim 6, wherein said blocking pin is secured against rotation around its longitudinal axis.

8. A hand drill as defined in claim 6, wherein said adjusting member is composed of synthetic plastic material and in a region of a radial extension of said blocking pin is surrounded by a circular reinforcing ring composed of metal.

9. A hand drill as defined in claim 6, wherein said adjusting member is composed of metal and has a through-going mounting opening located in a radial extension of said blocking pin.

10. A hand drill as defined in claim 1, wherein said teeth are arranged on an outer end of said blocking slider while said counter teeth cooperating with said teeth are arranged on an inner circumference of said adjusting ring.

* * * * *